United States Patent [19]

Sato et al.

[11] Patent Number: 4,900,612
[45] Date of Patent: Feb. 13, 1990

[54] LAMINATED STRUCTURE

[75] Inventors: Koichiro Sato, Waki; Mikio Nakagawa, Hiroshima; Kuniaki Kanemoto, Iawkuni; Akito Nishimura, Iwakuni, all of Japan

[73] Assignee: Mitsui Petrochemical Industries, Ltd., Tokyo, Japan

[21] Appl. No.: 898

[22] Filed: Jan. 6, 1987

Related U.S. Application Data

[63] Continuation-in-part of Ser. No. 867,136, May 27, 1986, abandoned.

[30] Foreign Application Priority Data

May 24, 1985 [JP] Japan .................................. 60-110546
Jan. 7, 1986 [JP] Japan ........................................ 61-254

[51] Int. Cl.$^4$ ............................................ B32B 27/32
[52] U.S. Cl. ..................................... 428/216; 428/442; 428/483; 428/516; 428/520
[58] Field of Search ............... 428/412, 483, 216, 520, 428/516

[56] References Cited

U.S. PATENT DOCUMENTS

| | | | |
|---|---|---|---|
| 4,058,647 | 11/1977 | Inoue et al. | 428/474 |
| 4,064,296 | 12/1977 | Bornstein et al. | 428/516 |
| 4,451,512 | 5/1984 | Yazaki et al. | 428/36 |
| 4,719,153 | 1/1988 | Akasawa et al. | 428/515 |

FOREIGN PATENT DOCUMENTS

| | | | |
|---|---|---|---|
| 0125107 | 11/1984 | European Pat. Off. | |
| 0063484 | 6/1978 | Japan | 428/516 |
| 0065379 | 6/1978 | Japan | 428/516 |
| 0168648 | 9/1985 | Japan | 428/516 |

*Primary Examiner*—P. C. Ives
*Attorney, Agent, or Firm*—Sherman and Shalloway

[57] ABSTRACT

A laminated structure comprising, laminated in the order stated, (A) a layer of polycarbonate or a layer of a polyester,
(B) a layer of a modified ethylene/alpha-olefin random copolymer, the modified copolymer containing about 0.01 to 10% by weight, based on the trunk ethylene/alpha-olefin random copolymer, of an unsaturated carboxylic acid or its derivative grafted thereto, and having an ethylene content of 75 to 95 mole %, a melt flow rate of 0.1 to 50 g/10 min., a density of 0.850 to 0.905 g/cm$^3$ and a crystallinity of less than 10%, and
(C) a layer of a saponified olefin/vinyl acetate copolymer or a layer of a polyamide resin.

24 Claims, No Drawings

LAMINATED STRUCTURE

This is a continuation-in-part application of U.S. patent pplication Ser. No. 867,136 filed on May 27, 1986 now abandoned.

This invention relates to a laminated structure composed of a plurality of polymer layers. More specifically, it relates to a laminated structure which comprises a polycarbonate layer or a polyester layer and a saponified olefin/vinyl acetate copolymer layer or a polyamide resin layer and has transparency and resistance to permeation to gases and excellent interfacial adhesion, particularly excellent interfacial adhesion after heat treatment or stretching.

Polycarbonate is a resin having excellent transparency, flavor retaining property and heat resistance. But since its permeability of gases such as oxygen is high, it is unsuitable for use as a packaging material which requires high resistance to gas permeation, for example packaging materials for foods, chemicals and cosmetics.

Polyester resins typified by polyethylene terephthalate (to be sometimes referred to as PET) are extensively used as films, sheets and packaging materials such as containers by utilizing their excellent properties such as high mechanical strength, rigidity, thermal resistance, chemical resistance, oil resistance and transparency. However, the polyester resins are not without defects. For example, they have the defect that containers made of the polyester resins cannot be sufficiently heat-set, and they have no sufficient resistance to gas permeation. In particular, the insufficient gas permeation resistance is attributed to the inherent properties of the polyester resins, and is difficult to overcome by molding techniques.

Lamination of a saponified olefin/vinyl acetate copolymer may be considered as one means for improving resistance to gas permeation. However, this method is not practical since the polycarbonate has poor adhesion to the saponified olefin/vinyl acetate copolymer and mere lamination leads to delamination during use.

It may also be possible to improve the gas permeation resistance of the polyester resins by laminating a resin having better gas permeation resistance than the polyester resins, such as polyvinylidene chloride, a saponification product of olefin/vinyl acetate copolymer, or polyamides. Such resins, however, have poor adhesion to the polyester resins. Even a three-layer structure composed of two layers of a polyester resin and a layer of such a resin having high gas permeation resistance interposed between them is likely to undergo partial delamination during stretch molding or during use and decrease in gas permeation resistance.

Some methods have previously been proposed to improve the adhesion between the polycarbonate and the saponified olefin/vinyl acetate copolymer or between the polyester and the saponified olefin/vinyl acetate copolymer or the polyamide resin.

Japanese Laid-Open Pat. Publication No. 129775/1974 discloses a method in which an ionomer or an ethylene/vinyl acetate copolymer is added to a saponified ethylene/vinyl acetate copolymer, and a layer of this polymer is laminated to a polycarbonate layer. According to this method, however, the transparency of the saponified ethylene/vinyl acetate copolymer layer is reduced, and the adhesion of it to the polycarbonate layer is not improved to a significant extent. Furthermore, the resulting laminated structure has markedly reduced adhesion strength after heat-treatment and becomes useless in practical applications.

U.S. Pat. No. 4,058,647 proposed a method in which a blend of 60 to 95% by weight of a modified polyolefin containing an unsaturated carboxylic acid or its anhydride in a concentration of 0.01 to 10% by weight and 40 to 5% by weight of a rubbery substance is laminated in the molten state to a saponified ethylene/vinyl acetate copolymer. Example 1 of this specification describes a laminate obtained by laminating a blend of 80 parts by weight of modified polypropylene composed of polypropylene having an MI of 0.8 and a specific gravity of 0.91 and 0.67% by weight of maleic anhydride grafted thereto and 20 parts by weight of an ethylene/propylene terpolymer to a saponified ethylene/vinyl acetate copolymer. The patent states that the adhesion strength between the layers of the blend and the saponified copolymer is 11.4 kg/15 mm. However, this laminate does not have sufficient transparency.

Japanese Pat. Publication No. 15464/1985 discloses a laminated structure composed of a polycarbonate layer and a polyolefin layer comprising a modified polyolefin having grafted thereto $10^{-4}$ to 15% by weight of maleic anhydride. Example 1 of this specification discloses that a composite bottle composed of an outside polycarbonate layer and an inside layer of a blend of 5 parts by weight of modified polyethylene having grafted thereto 2.5% by weight of maleic anhydride and 95 parts by weight of low-density polyethylene having an MI value of 1 was produced, and the adhesion strength between the two layers of the bottle was 200 g/cm.

Japanese Laid-Open Pat. Publication No. 27975/1984 discloses an adhesive for aromatic resins comprising a modified polyolefin having an unsaturated dicarboxylic acid or its anhydride grafted thereto. The modified polyolefin has an intrinsic viscosity of 0.5 to 5 dl/g, a crystallinity of 5 to 65% and an $\overline{Mw}/\overline{Mn}$ ratio of 1 to 15, and is produced by grafting 0.01 to 5 parts by weight of the unsaturated dicarboxylic acid or its anhydride to 100 parts by weight of a crystalline polyolefin having a crystallinity of 5 to 65% and an $\overline{Mw}/\overline{Mn}$ ratio of 1 to 10. Example 1 of this specification discloses a three-layer laminated structure composed of a layer of high-density polyethylene having an intrinsic viscosity of 1.5 dl/g and a polycarbonate layer as outside layers and maleic anhydride-grafted ethylene/propylene copolymer having an intrinsic viscosity of 1.4 dl/g, a crystallinity of 14%, an $\overline{Mw}/\overline{Mn}$ ratio of 3.1, a melt viscosity of $3.5 \times 10^5$ poises as an interlayer. It states that the adhesion strength between the polycarbonate layer and the interlayer was 650 g/cm, and the high-density polyethylene layer could not be peeled off from the interlayer.

Japanese Laid-Open Pat. Publication No. 29160/1984 discloses a laminated molded structure having the same modified polyolefin as the modified polyolefin described in Japanese Laid-Open Pat. Publication No. 27975/1984 as an interlayer and a surface layer of a polyolefin and a substrate layer of an aromatic resin. Example 1 of this patent document discloses substantially the same laminated structure as in Example 1 of the above-cited Japanese Laid-Open Pat. Publication No. 27975/1984.

It is an object of this invention to provide a novel laminated structure.

Another object of this invention is to provide a novel laminated structure having a polycarbonate layer and a saponified olefin/vinyl acetate copolymer layer and an interlayer having excellent adhesion strength to both of these layers.

Another object of this invention is to provide a novel laminated structure having a polycarbonate layer and a saponified olefin/vinyl acetate copolymer layer and an interlayer which does not impair the transparency of these two layers.

Another object of this invention is to provide a novel laminated structure having a polycarbonate layer and a saponified olefin/vinyl acetate copolymer layer and an interlayer which even after heat-treatment, retains excellent adhesion to the two layers.

Another object of this invention is to provide a laminated structure having a polycarbonate layer and a saponified olefin/vinyl acetate copolymer layer which are bonded through an interlayer of a modified ethylene/alpha-olefin random copolymer which is obtained by grafting an unsaturated carboxylic acid or its derivative and has a very low crystallinity or is amorphous.

Another object of this invention is to provide a novel laminated structure having a polyester layer and a saponified olefin/vinyl acetate copolymer layer or a polyamide layer and an interlayer having excellent adhesion strength to both of these layers.

Another object of this invention is to provide a novel laminated structure having a polyester layer and a saponified olefin/vinyl acetate copolymer layer or a polyamide layer and an interlayer which does not impair the transparency of these two layers.

Another object of this invention is to provide a novel laminated structure having a polyester layer and a saponified olefin/vinyl acetate copolymer layer or a polyamide layer and an interlayer which even after stretching, retains excellent adhesion to the two layers.

Another object of this invention is to provide a laminated structure having a polyester layer and a saponified olefin/vinyl acetate copolymer layer or a polyamide layer which are bonded through an interlayer of a modified ethylene/alpha-olefin random copolymer which is obtained by grafting an unsaturated carboxylic acid or its derivative and has a very low crystallinity or is amorphous.

Additional objects of the invention along with its advantages will become apparent from the following description.

According to this invention, the above objects and advantages of the invention are achieved firstly by a laminated structure comprising, laminated in the order stated, (A) a layer of polycarbonate, (B) a layer of a modified ethylene/alpha-olefin random copolymer, the modified copolymer containing about 0.01 to 10% by weight, based on the trunk ethylene/alpha-olefin random copolymer, of an unsaturated carboxylic acid or its derivative grafted thereto, and having an ethylene content of 75 to 95 mole %, a melt flow rate of 0.1 to 50 g/10 min., a density of 0.850 to 0.905 g/cm$^3$ and a crystallinity of less than 10%, and (C) a layer of a saponified olefin/vinyl acetate copolymer;

and secondly by a laminated structure comprising, laminated in the order stated, (A') a layer of polyester, (B') a layer of a modified ethylene/alpha-olefin random copolymer, the modified copolymer containing about 0.01 to 10% by weight, based on the trunk ethylene/alpha-olefin random copolymer, of an unsaturated carboxylic acid or its derivative grafted thereto, and having an ethylene content of 75 to 95 mole %, a melt flow rate of 0.1 to 50 g/10 min., a density of 0.850 to 0.905 g/cm$^3$ and a crystallinity of less than 10%, and (C') a layer of a saponified olefin/vinyl acetate copolymer or a polyamide resin.

Various polycarbonates and copolycarbonates obtained by reacting dihydroxy compounds with phosgene or diphenyl carbonate by known methods are suitably used as the polycarbonate constituting the layer (A) of the laminated structure. Aromatic dihydroxy compounds and alicyclic dihydroxy compounds are preferred as the dihydroxy compounds. Examples include hydroquinone, resorcinol, 4,4'-dihydroxy-diphenylmethane, 4,4'-dihydroxy-diphenylethane, 4,4'-dihydroxydiphenyl-n-butane, 4,4'-dihydroxydiphenyl-heptane, 4,4'-dihydroxydi-phenylphenylmethane, 4,4'-dihydroxy-diphenyl-2,2-propane (bisphenol A), 4,4'-dihydroxy-3,3'-dimethyl-diphenyl-2,2-propane, 4,4'-dihydroxy-3,3'-diphenyl-diphenyl-2,2-propane, 4,4'-dihydroxy-dichloro-diphenyl-2,2-propane, 4,4'-dihydroxy-diphenyl-1,1-cyclopentane, 4,4'-dihydroxy-diphenyl-1,1-cyclohexane, 4,4'-dihydroxy-diphenyl-methlyphenylmethane, 4,4'-dihydroxy-diphenyl-ethyl-phenylmethane, 4,4'-dihydroxy-diphenyl-2,2,2-tri-chloro-1,1-ethane, 2,2'-dihydroxydiphenyl, 2,6-dihydroxynaphthalene, 4,4'-dihydroxydiphenyl ether, 4,4'-dihydroxy-3,3'-dichlorodiphenyl ether and 4,4'-dihydroxy-2,5-diethoxyphenyl ether. Polycarbonate prepared by using 4,4'-dihydroxy-diphenyl-2,2-propane (bisphenol A) is especially preferred because of its excellent mechanical properties and transparency.

The saponified olefin/vinyl acetate copolymer constituting the layer (C) of the laminated structure of the invention is a saponification product of an olefin/vinyl acetate copolymer having an olefin content of 15 to 60 mole %, preferably 25 to 50 mole %. The saponification product has a degree of saponification of preferably at least 50%, more preferably at least 90%. If the olefin content is less than 15 mole %, the saponified copolymer tends to be not entirely satisfactory in respect of resistance to thermal decomposition, melt-processability, stretchability and water resistance (moisture absorption and swellability). If the olefin content exceeds 60 mole % or the degree of saponification is less than 50%, the copolymer has poor resistance to gas permeation.

Alpha-olefins having 1 to 18 carbon atoms are preferred as the olefin for composing the saponified olefin/vinyl acetate copolymer. Examples include ethylene, propylene, 1-butene, 1-hexene, 4-methyl-1-pentene, 1-octene, 1-decene, 1-tetradecene and 1-octadecene.

Saponified olefin/vinyl acetate copolymer is especially preferred as the saponified olefin/vinyl acetate copolymer in view of its mechanical strength and processability.

The thermoplastic polyester (A') denotes polyesters esters composed of units of dihydroxy compounds selected from aliphatic glycols such as ethylene glycol, propylene glycol, 1,4-butanediol, neopentyl glycol and hexamethylene glycol, alicyclic glycols such as cyclohexanedimethanol, aromatic dihydroxy compounds such as bisphenol or mixtures of at least two types of these and units of dicarboxylic acids selected from aromatic dicarboxylic acids such as terephthalic acid, isophthalic acid and 2,6-naphthalenedicarboxylic acid, aliphatic dicarboxylic acids such as oxalic acid, succinic acid, adipic acid, sebacic acid and undecadicarboxylic acid, alicyclic dicarboxylic aicds such as hexahydroterephthalic acid, or mixtures of at least two types of these. These polyesters may be modified with small amounts of trihydric or higher polyhydroxy compounds such as triols or tricarboxylic acids, or polycarboxylic acids so long as the polyesters remain thermoplastic. Specific examples of the thermoplastic polyesters are polyethylene terephthalate, polybutylene terephthalate, and polyethylene isophthalate terephthalate copolymer.

Examples of the polyamide resin (C') include polyamides obtained by polycondedensation of aliphatic, alicyclic or aromatic diamines such as hexamethylenediamine, decamethylenediamine, dodecamethylenediamine, 2,2,4- or 2,4,4-trimethylhexamethylenediamine, 1,3- or 1,4-bis(aminomethyl)cyclohexane, bis(p-aminocyclohexylmethane) and m- or p-xylylenediamine and aliphatic, alicyclic or aromatic dicarboxylic acids such as adipic acid, suberic acid, sebacic acid, cyclohexanedicarboxylic acid, terephthalic acid and isophthalic acid; polyamides obtained by polycondensation of aminocarboxylic acids such as epsilon-aminocaproic acid and 11-aminoundecanoic acid; polyamides obtained by ring-opening polymerization of lactams such as epsilon-caprolactam and omega-laurolactam; copolyamides composed of two or more of these components; ad mixtures of these polyamides. Specific examples are nylon 6, nylon 66, nylon 610, nylon 9, nylon 11, nylon 12, nylon 6/66, nylon 66/610 and nylon 6/11. There is no restriction on the molecular weights of these polyamides. Usually polyamides having a relative viscosity r(measured in 98% sulfuric acid in accordance with JIS K-6819) of at least 0.5, preferably at least 2.0 are conveniently used in this invention.

The saponified olefin/vinyl acetate copolymer constituting the layer (C') may be the same as described above with regard to the layer (C).

The laminated structure of this invention comprises the layer (B') of a modified ethylene/alpha-olefin random copolymer as an interlayer for firmly bonding the layers (A) and (C), or (A') and (C').

The modified ethylene/alpha-olefin random copolymer (to be sometimes referred to simply as the modified copolymer) contains about 0.01 to 10% by weight, preferably 0.1 to 5% by weight, based on the ethylene/alpha-olefin random copolymer as a trunk, of an unsaturated carboxylic acid or its derivative. If the amount of the unsaturated carboxylic acid or its derivative grafted is less than 0.01% by weight, the adhesion of the interlayer to the polycarbonate layer (A) and the saponified olefin/vinyl acetate copolymer layer (C) or to the polyester layer (A') and the saponified olefin/vinyl acetate copolymer or polyamide resin layer (C') cannot be improved. On the other hand, if it exceeds 10% by weight, the modified copolymer is partly crosslinked and is inferior in processability transparency and adhesion strength.

The modified copolymer has a ethylene content of 75 to 95 mole %, preferably 77 to 93 mole %.

The modified copolymer also has a melt flow rate (MFR$_2$ in accordance with ASTM D1238L) of 0.1 to 50 g/10 min., preferably 0.2 to 20 g/10 min.

The modified copolymer has a density of 0.850 to 0.905 g/cm$^3$, preferably 0.860 to 0.900 g/cm$^3$.

Finally, the modified copolymer has a crystallinity of less than 10%, more preferably less than 7%. If the MFR$_2$ is outside the above-specified range, the viscosity of the modified copolymer is too high or too low and has poor processability and adhesion strength.

If the modified copolymer has a density of more than 0.905 g/cm$^3$ and a crystallinity, determined by X-ray, of more than 30%, the modified copolymer is inferior in adhesion strength after it has been subjected to stretching.

Alpha-olefins having 3 to 20 carbon atoms are suitable as the alpha-olefin constituting the modified copolymer. Specific examples are propylene, 1-butene, 1-hexene, 4-methyl-1-pentene, 1-octene, 1-decene, 1-tetradecene and 1-octadecene. These alpha-olefins may be used singly or in combination.

The modified copolymer of layer (B) or (B') can be produced by grafting the unsaturated carboxylic acid or its derivative to an ethylene/alpha-olefin random copolymer. The ethylene/alpha-olefin random copolymer before modification usually has a melt flow rate (MFR$_2$) of 0.1 to 70 g/10 min., and has the same density, ethylene content and crystallability to that of the modified copolymer.

Examples of the unsaturated carboxylic acid or its derivative to be grafted include unsaturated carboxylic acids such as acrylic acid, maleic acid, fumaric acid, tetrahydrophthalic acid, itaconic acid, citraconic acid, crotonic acid, isocrotonic acid, and Nadic acid ® (endo-cis-bicyclo[2,2,1]hept-5-ene-2,3-dicarboxylic acid); and derivatives thereof such as acid halides, amides, imides, anhydrides and esters. Specific examples of the derivatives are malenyl chloride, maleimide, maleic anhydride, citraconic anhydride, monomethyl maleate, dimethyl maleate, and glycidyl maleate. Among these, the unsaturated dicarboxylic acids and their anhydrides are preferred. Maleic acid, Nadic acid ® and their anhydrides are especially preferred.

Various known methods can be used to produce the modified copolymer by grafting a grafting monomer selected from the unsaturated carboxylic acids and their derivatives to the unmodified ethylene/alpha-olefin random copolymer. For example, the unmodified ethylene/alpha-olefin random copolymer is melted and the grafting monomer is added to it and graft-copolymerized. Alternatively, the unmodified ethylene/alpha-olefin random copolymer is dissolved in a solvent, and the grafting monomer is added and graft-copolymerized. In an case, the reaction is preferably carried out in the presence of a radical initiator in order to perform graft-copolymerization with good efficiency. The grafting reaction is carried out usually at a temperature of 60° to 350° C. The proportion of the radical initiator is usually 0.001 to 1 part by weight per 100 parts by weight of the unmodified ethylene/alpha-olefin random copolymer. The radical initiator maybe an organic peroxide, an organic perester or an azo compound. Specific examples include benzoyl peroxide, dichlorobenzoyl peroxide, dicumyl peroxide, di-tert-butyl peroxide, 2,5-dimethyl-2,5-di(peroxybenzoate) hexyne-3, 1,4-bis(tert-butylperoxyisopropyl)benzene, lauroyl peroxide, tert-butyl peracetate, 2,5-dimethyl-2,5-di(tert-butylperoxy)-hexyne-3, 2,5-dimethyl-2,5-di-(tert-butylperoxy) hexane, tert-butyl perbenzoate, tert-butyl perphenylacetate, tert-butyl perisobutyrate, tert-butyl per-sec-octoate, tert-butyl perpivalate, cumyl perpivalate, tert-butyl perdiethylacetate, azobisisobutyronitrile and dimethyl azoisobutyrate. Among these, dialkyl peroxides such as dicumyl peroxide, di-tert-butyl peroxide, 2,5-dimethyl-2,5-dimethyl-2,5-di(tert-butylperoxy)hexane and 1,4-bis(tert-butylperoxyisopropyl) benzene are preferred.

The modified copolymer used in this invention may be mixed with an unmodified ethylene/alpha-olefin random copolymer to form the modified copolymer layer (B) or (B') of the laminated structure of the invention so long as the amount of the unsaturated carboxylic acid or its derivative grafted in the mixture is in the range of 0.01 to 10% by weight. Furthermore, the modified copolymer used in this invention may be mixed with a modified or unmodified ethylene/alpha-olefin random copolymer having a crystallinity of more than 10% to form the modified copolymer layer (B) or (B') of the laminated structure of the invention so long as the crystallinity of the mixture is less than 10%.

A heat stabilizer, a weatherability stabilizer, an antistatic agent, a sigment, a dye, a corrosion inhibitor, etc. may be incorporated in one or more of the layers (A), (B) and (C) forming the laminated structure of this invention so long as the additives do not impair the object of this invention.

The laminated structure of this invention may, for example, be in the form of a film, sheet or bottle.

The laminated structure of this invention may be produced, for example, by a method which comprises melting the polymers for the three layers in different extruders, feeding the molten polymers into a die of a three-layer structure, and co-extruding them with the modified copolymer layer (B) or (B') as an interlayer, or a method (so-called sandwich laminate method) which comprises forming the polycarbonate layer (A) or the polyester layer (A') and the saponified olefin/vinyl acetate copolymer layer (C) or the layer (C') of the saponified olefin/vinyl acetate copolymer or the polyamide resin separately, and melt-extruding the modified copolymer as an interlayer into between the layers (A) and (C) or between the layers (A') and (C'). If the laminated structure to be produced is in the form of a bottle, a keg, a pipe or a tube, the co-extrusion molding method can be used advantageously. Furthermore, the use of the co-extrusion molding method is preferred because it can easily give a high interfacial adhesion.

The laminated structure of this invention comprising the layers (A'), (B') and (C') may be stretched monoaxially or biaxially in order to improve rigidity, transparency, mechanical strength, etc. or impart shrinkability. There is no particular restriction on the stretching conditions. Generally, the stretching is at a stretch carried out at a temperature of 70° to 150° C. ratio of 2 to 10 times in the case of monoaxial stretching and at a stretch ratio of 2 to 10 times in the longitudinal direction and 2 to 10 times in the transverse direction in the case of biaxial stretching.

The thickness of each layer of the laminated structure can be properly determined depending upon the end use of the laminated structure. Usually, if the laminated structure comprising the layers (A), (B) and (C) is a film or sheet, the layer (A) preferably has a thickness of 0.01 to 5 mm, and the layers (B) and (C) preferably have a thickness of 0.005 to 1 mm, and if the laminated structure comprising the layers (A'), (B') and (C') is a film or sheet, the layer (A') preferably has a thickness of 0.02 to 5 mm, and the layers (B') and (C') preferably have a thickness of 0.01 to 1 mm. If the laminated structure comprising the layers (A'), (B') and (C') forms a container such as a bottle, the layer (A') preferably has a thickness of 0.1 to 5 mm, and the layers (B') and (C') preferably have a thickness of 0.01 to 1 ml.

The laminated structure of this invention may comprise three layers (A) or (A'), (B) or (B') and (C) or (C'), or may comprise 5 or more layers additionally having another kind of polymer layers such as polyolefin. An example of the multilayer laminate is one comprising, for example, the polycarbonate layer (A)/the modified random copolymer layer (B')/the saponified olefin-vinyl acetate copolymer layer or the polyamide resin layer (C)/the modified random copolymer layer (B)/a polypropylene layer, and the polyester layer (A')/the modified random copolymer layer (B')/the saponified olefin-vinyl acetate copolymer layer or the polyamide resin layer (C')/the modified random copolymer layer (B')/polyolefin layer.

Depending upon its use, the laminated structure of this invention may be a 5-layer structure comprising three types of polymer, which, for example, comprises the polyester resin layer (A')/modified random copolymer layer (B')/saponified olefin-vinyl acetate copolymer layer or the polyamide resin layer (C')/modified random copolymer layer (B')/polyester resin layer (A').

The laminated structure of this invention comprising the layers (A), (B) and (C) can be used, for example as packaging film or bottles for foods and medicines since it has transparency, flavor retaining property and heat resistance which are the characteristic features of polycarbonates and resistance to gas permeation which is the characteristic feature of the saponified olefin/vinyl acetate copolymer or the polyamide resin, and possesses a high interfacial adhesion in the initial stage and after stretching.

The laminated structure of this invention comprising the layers (A'), (B') and (C') simultaneously have the transparency, rigidity, chemical resistance, oil resistance and food safety of the polyester resin, the gas permeation resistance, transparency and flavor-retaining property of the saponification product of the olefin/vinyl acetate copolymer, and the gas permeation resistance, transparency and flavor-retaining property of the polyamide resin possesses a high interfacial adhesion not only in the initial stage but also after monoaxial or biaxial stretching. Hence, it is conveniently used as packaging materials for foods, drinks and drugs, in form of bottles, cups and films.

The following examples illustrate the present invention in greater detail. It should be understood that unless the invention departs from its scope described and claimed herein, it is not to be limited in any way to these examples.

EXAMPLE 1

A five-layer water-cooled inflation film was produced under the following conditions by using maleic anhydride-grafted ehtylene/propylene random copolymer (to be abbreviated to MAH.EPR-1; $MFR_2$ 0.5 g/10 min.; the amount of maleic anhydride grafted 0.5 g/100 g of polymer; ethylene content 80 mole %; density 0.865 g/cm$^3$, crystallinity 4%), polycarbonate (to be abbreviated to PC; tradename Panlite L-1250, a product of Teijin Chemical Co., LTD.), and saponified ethylene/vinyl acetate copolymer (to be abbreviated to EVOH; $MFR_2$ 1.3 g/10 min., density 1.19 g/cm$^3$, ethylene content 32 mole %; tradename Kuraray Eval EP-F, a product of Kuraray Inc.).

Layer construction:
PC/MAH.EPR-1/EVOH.MAH.EPR-1/PC=20/20/20/20/20 micrometers

Extruder:
40 mm$\phi$ extruder 280° C. (for PC)
40 mm$\phi$ extruder 210° C. (for MAH.EPR-1)

40 mmφ extruder 210° C. (for EVOH)
Processing speed: 15 meters/min.

The interfacial adhesion strength ($F_{PC}$, g/15 mm width) between the PC layer and the MAH.EPR-1 layer of the resulting five-layer film, and the interfacial adhesion strength ($F_{EVPH}$, g/15 mm width) between the EVOH layer and the MAH.EPR-1 layer were measured by T-peel method at a pelling speed of 300 mm/min. The five-layer film was autoclaved at 131° C. for 1 hour, and then its interfacial adhesion strengths were measured as above. The transparency of the film was expressed by haze (%) measured in accordance with ASTM D1003. The results are shown in Table 1.

EXAMPLE 2

Example 1 was repeated except that maleic anhydride-grafted ethylene/propylene random copolymer (to be abbreviated to MAH.EPR-2; $MFR_2$ 1.9 g/10 min.; the amount of maleic anhydride grafted 0.1 g/100 g of polymer; ethylene content 80 mole %; density 0.864 g/cm$^3$; crystallinity 4%) was used instead of MAH.EPR-1 used in Example 1. The results are shown in Table 1.

EXAMPLE 3

Example 1 was repeated except that a composition ($MFR_2$ 1.1 g/10 min.; the amount of maleic anhydride grafted 0.25 g/100 g of polymer; ethylene content 80 mole %; density 0.865 g/cm$^3$; crystallinity 4%) composed of 50 parts by weight of MAH.EPR-1 used in Example 1 and 50 parts by weight of unmodified ethylene/propylene random copolymer (to be abbreviated to EPR-1; $MFR_2$ 2.0 g/10 min.; ethylene content 80 mole %; desnity 0.864 g/cm$^3$; crystallinity 4%) was used instead of MAH.EPR-1 used in Example 1. The results are shown in Table 1.

EXAMPLE 4

Example 1 was repeated except that a composition ($MFR_2$ 1.4 g/10 min.; the amount of maleic anhydride grafted 0.25 g/100 g of polymer; density 0.874 g/cm$^3$; crystallinity 9%) composed of 50 parts by weight of MAH.EPR-1 used in Example 1 and 50 parts by weight of unmodified ethylene/1-butene random copolymer (to be abbreviated to EBR-1; $MFR_2$ 4.0 g/10 min.; ethylene content 90 mole %; density 0.885 g/cm$^3$; crystallinity 16%) was used instead of MAH.EPR-1 used in Example 1. The results are shown in Table 1.

EXAMPLE 5

Example 1 was repeated except that a composition ($MFR_2$ 1.3 g/10 min.; the amount of maleic anhydride grafted 0.25 g/100 g of polymer; density 0.874 g/cm$^3$; crystallinity 9%) composed of 50 parts by weight of EPR-1 used in Example 3 and 50 parts by weight of maleic anhydride-grafted ethylene/1-butene random copolymer (to be abbreviated to MAH.EBR-1; $MFR_2$ 3.2 g/10 min.; the amount of maleic anhydride grafted 0.5 g/100 g of polymer; ethylene content 90 mole %; density 0.885 g/cm$^3$; crystallinity 14%) was used instead of MAH.EPR-1 used in Example 1. The results are shown in Table 1.

COMPARATIVE EXAMPLE 1

Example 1 was repeated except that EPR-1 used in Example 1 was used instead of MAH.EPR-1 used in Example 1. The results are shown in Table 1.

COMPARATIVE EXAMPLE 2

Example 1 was repeated except that MAH.EBR-1 used in Example 5 was used instead of MAH.EPR-1 used in Example 1. The results are shown in Table 1.

COMPARATIVE EXAMPLE 3

Example 1 was repeated except that maleic anhydride-grafted ethylene/vinyl acetate copolymer (abbreviated to MAH.EVA-1; $MFR_2$ 2.1 g/10 min.; the amount of maleic anhydride grafted 0.3 g/100 g of polymer; vinyl acetate content 19 wt. %; density 0.94 g/cm$^3$; crystallinity 27%) was used instead of MAH.EPR-1 used in Example 1. The results are shown in Table 1.

COMPARATIVE EXAMPLE 4

Example 1 was repeated except that maleic anhydride-grafted ethylene/propylene random copolymer (to be abbreviated to MAH.EPR-3; $MFR_2$ 4.3 g/10 min.; the amount of maleic anhydride grafted 0.5 g/100 g of polymer; ethylene content 80 mole %; density 0.891 g/cm$^3$; crystallinity 14%) was used instead of MAH.EPR-1 used in Example 1. The results are shown in Table 1.

COMPARATIVE EXAMPLE 5

Example 1 was repeated except that maleic anhydride-grafted propylene/ethylene random copolymer (to be abbreviated to MAH.PEC; $MFR_2$ 1.1 g/10 min.; the amount of maleic anhydride grafted 0.9 g/100 g of polymer; ethylene content 35 mole %; density 0.872 g/cm$^3$; crystallinity 10%) was used instead of MAH.EPR-1 used in Example 1. The results are shown in Table 1.

COMPARATIVE EXAMPLE 6

Example 1 was repeated except that maleic anhydride-grafted ethylene/propylene random copolymer (to be abbreviated to MAH.EPR-4; $MFR_2$ 2.9 g/10 min.; the amount of maleic anhydride grafted 1.0 g/100 g of polymer; ethylene content 90 mole %; density 0.902 g/cm$^3$; crystallinity 40%) was used instead of MAH.EPR-1 used in Example 1. The results are shown in Table 1.

TABLE 1

| Test Items | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Before heat-treatment | | | | | | | | | | | |
| $F_{PC}$ (g/15 mm width) | 820 | 750 | 800 | 930 | 810 | 0 | 890 | 810 | 870 | 750 | 510 |
| $F_{EVOH}$ (g/15 mm width) | Unpeelable | Unpeelable | Unpeelable | Unpeelable | Unpeelable | 0 | Unpeelable | 520 | Unpeelable | Unpeelable | 540 |
| Haze (%) | 1.1 | 1.2 | 1.3 | 1.2 | 1.2 | 1.1 | 1.3 | 1.2 | 1.4 | 3.5 | — |
| After heat treatment | | | | | | | | | | | |
| $F_{PC}$ (g/15 mm width) | 330 | 350 | 310 | 250 | 270 | 0 | 120 | 30 | 110 | 150 | 20 |

TABLE 1-continued

| Test Items | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| $F_{EVOH}$ (g/15 mm width) | Unpeelable | Unpeelable | Unpeelable | Unpeelable | Unpeelable | 0 | Unpeelable | 530 | Unpeelable | Unpeelable | 520 |
| Haze (%) | 1.2 | 1.2 | 1.3 | 1.3 | 1.4 | 1.4 | 1.4 | 1.3 | 1.5 | 3.7 | 1.4 |

EXAMPLE 6

A three-layer cast sheet was formed under the following conditions by using maleic anhydride-grafted ethylene/propylene random copolymer (MAH.EPR-1; $MFR_2$ 0.5 g/10 min., the amount of maleic anhydride grafted 0.5 g/100 g polymer, ethylene content 80 mole %, density 0.865 g/cm$^3$, crystallinity 4%), polyethylene terephthalate (PET; tradename Mitsui PET J 135, a product of Mitsui PET Resin Co., Ltd.), and a saponified product of ethylene/vinyl acetate copolymer (EVOH; $MFR_2$ 1.3 g/10 min., density 1.19 g/cm$^3$, ethylene content 32 mole %; tradename Kuraray Eval EP-F, a product of Kuraray Inc.).
Film layer construction:
  PET/MAH.EPR-1/EVOH = 120/60/120 micrometers
Extruder:
  40 mm$\phi$ extruder 280° C. (for PET)
  40 mm$\phi$ extruder 210° C. (for MAH.EPR-1)
  40 mm$\phi$ extruder 210° C. (for EVOH)
Molding speed: 10 meters/min.

The interfacial adhesion strength ($F_1$, g/15 mm width) between the PET layer and the MAH.EPR-1 layer of the resulting three-layer sheet, and the interfacial adhesion strength ($F_2$, g/15 mm width) between the EVOH layer and the MAH.EPR-1 layer were measured by T-peel method at a peeling speed of 300 mm/min. The transparency of the resulting sheet was evaluated by using a haze meter. The three layer sheet was heated at 80° C. for 10 minutes, and at this temperature stretched simultaneously to three times longitudinally and to three times transversely to prepare a three-layer stretched sheet. Subsequently, the sheet was cooled to room temperature, and the interfacial adhesion strength ($F_3$, g/15 mm width) between the PET layer and the MAH.EPR-1 layer and the interfacial adhesion strength ($F_4$, g/15 mm width) between the EVOH layer and the MAH.EPR-1 layer in the resulting stretched sheet were measured by T-peel at a peeling speed of 300 mm/min. The transparency of the three-layer stretched sheet was evaluated by using a haze meter. The results are shown in Table 2.

EXAMPLE 7

Example 6 was repeated except that a maleic anhydride-grafted ethylene/propylene random copolymer (MAH.EPR-2; $MFR_2$ 1.9 g/10 min., the amount of maleic anhydride grafted 0.1 g/100 g polymer, ethylene content 80 mole %, density 0.864 g/cm$^3$, crystallinity 4%) was used instead of MAH.EPR-1. The results are shown in Table 2.

EXAMPLE 8

Example 6 was repeated except that a composition ($MFR_2$ 1.1 g/10 min., the amount of maleic anhydride grafted 0.25 g/100 g of polymer, ethylene content 80 mole %, density 0.865 g/10 min., crystallinity 4%) formed by mixing 50 parts by weight of MAH.EPR-1 and 50 parts by weight of an unmodified ethylene/propylene random copolymer (EPR-1; $MFR_2$ 2.0 g/10 min., ethylene content 80 mole %, density 0.864 g/cm$^3$, crystallinity 4%) was used instead of MAH.EPR-1. The results are shown in Table 2.

EXAMPLE 9

Example 6 was repeated except that a composition ($MFR_2$ 1.4 g/10 min., the amount of maleic anhydride grafted 0.256 g/100 g of polymer, density 0.874 g/cm$^3$, crystallinity 9%) obtained by mixing 50 parts by weight of MAH.EPR-1 and 50 parts by weight of unmodified ethylene/1-butene random copolymer (EBR-1; $MFR_2$ 4.0 g/10 min., ethylene content 90 mole %, density 0.885 g/cm$^3$, crystallinity 16%) was used instead of MAH.EPR-1. The results are shown in Table 2.

EXAMPLE 10

Example 6 was repeated except that a composition ($MFR_2$ 1.3 g/10 min., the amount of maleic anhydride grafted 0.25 g/100 g of polymer, density 0.874 g/cm$^3$, crystallinity 9%) obtained by mixing 50 parts by weight of maleic anhydride-grafted ethylene/1-butene random copolymer (MAH.EBR-1; $MFR_2$ 3.2 g/10 min., the amount of maleic anhydride grafted 0.5 g/100 g of polymer, ethylene content 90 mole %, density 0.885 g/cm$^3$, crystallinity 14%) with 50 parts by weight of EPR-1 used in Example 8 was used instead of MAH.EPR-1. The results are shown in Table 2.

EXAMPLE 11

Example 6 was repeated except that nylon 6 (trademark Aramine CM1021XF, a product of Toray Co., Ltd.) was used instead of EVOH, and the temperature of the extruder for nylon was adjusted to 250° C. The results are shown in Table 2.

EXAMPLE 12

Example 6 was repeated except that PET-G (amorphous polyethylene terephthalate-type copolymer resulting from substitution of 1,4-cyclohexanedimethanol for part of the glycol component; trademark KODAR PETG6763, a product of Eastmann Chemical) was used instead of PET and a non-stretched three-layer T-die sheet was formed. The interfacial adhesion strengths and transparency of the non-stretched sheet were evaluated as in Example 6. The results ar shown in Table 2.

COMPARATIVE EXAMPLE 7

Example 6 was repeated except that EPR-1 used in Example 8 was used instead of MAH.EPR-1. The results are shown in Table 2.

COMPARATIVE EXAMPLE 8

Example 6 was repeated except that maleic anhydride-grafted LDPE (MAH.LDPE-1, $MFR_2 = 3.0$ g/10 min., the amount of maleic anhydride grafted 0.3 g/100 g of polymer, density 0.920 g/cm$^3$, crystallinity 50%) was used instead of MAH.EPR-1. The results are shown in Table 2.

COMPARATIVE EXAMPLE 9

Example 6 was repeated except that a molten mixture (MFR$_2$ 1.5 g/10 min., the amount of maleic anhydride grafted 0.21 g/100 g of polymer, density 0.907 g/cm$^3$, crystallinity 40%) obtained by mixing 70 parts by weight of maleic anhydride-grafted polyethylene (MAH-PE; MFR$_2$ 2.0 g/10 min., the amount of maleic anhydride grafted 0.3 g/100 g of polymer, density 0.925 g/cm$^3$, crystallinity 55%) and 30 parts by weight of EPR-1 used in Example 8 was used instead of MAH-.EPR-1. The results are shown in Table 2.

COMPARATIVE EXAMPLE 10

Comparative Example 9 was repeated except that MAH.EPR-1 used in Example 6 was used instead of EPR-1 used in Comparative Example 9. The results are also shown in Table 2.

TABLE 2

| | Unstretched Film | | | Stretched Film | | |
|---|---|---|---|---|---|---|
| | F$_1$ (g/15 mm width) | F$_2$ (g/15 mm width) | Haze (%) | F$_3$ (g/15 mm width) | F$_4$ (g/15 mm width) | Haze (%) |
| Example | | | | | | |
| 6 | 1200 | Unpeelable | 1.0 | 370 | Unpeelable | 0.6 |
| 7 | 1050 | 1270 | 0.9 | 290 | 380 | 0.5 |
| 8 | 1140 | Unpeelable | 1.0 | 340 | 450 | 0.6 |
| 9 | 970 | Unpeelable | 1.1 | 270 | 340 | 0.7 |
| 10 | 940 | Unpeelable | 1.1 | 320 | 330 | 0.7 |
| 11 | 1250 | Unpeelable | 0.9 | 380 | Unpeelable | 0.5 |
| 12 | 1300 | Unpeelable | 0.8 | — | — | — |
| Comparative Example | | | | | | |
| 6 | 20 | 30 | 0.9 | 10 | 10 | 0.5 |
| 7 | 150 | 700 | 2.5 | 20 | 30 | 1.4 |
| 8 | 470 | 1500 | 4.2 | 40 | 60 | 2.0 |
| 9 | 520 | Unpeelable | 4.6 | 50 | 70 | 2.3 |

What we claim is:

1. A laminated structure comprising, laminated in the order stated,
   (A) a layer of polycarbonate,
   (B) a layer of a modified ethylene/alpha-olefin random copolymer, the modified copolymer containing about 0.01 to 10% by weight, based on the trunk ethylene/alpha-olefin random copolymer, of an unsaturated carboxylic acid or its derivative grafted thereto, and having an ethylene content of 75 to 95 mole %, a melt flow rate of 0.1 to 50 g/10 min., a density of 0.850 to 0.905 g/cm$^3$ and a crystallinity of less than 10%, and
   (C) a layer of a saponified olefin/vinyl acetate copolymer.

2. The laminated structure of claim 1 wherein the amount of the unsaturated carboxylic acid or its derivative grafted is 0.1 to 5% by weight.

3. The laminated structure of claim 1 wherein the modified ethylene/alpha-olefin random copolymer has an ethylene content of 77 to 93 mole %.

4. The laminated structure of claim 1 wherein the modified ethylene/alpha-olefin random copolymer has a melt flow rate of 0.2 to 20 g/10 min.

5. The laminated structure of claim 1 wherein the modified ethylene/alpha-olefin random copolymer has a density of 0.860 to 0.900 g/cm$^3$.

6. The laminated structure of claim 1 wherein the polycarbonate has units derived from an aromatic dihydroxy compound or an alicyclic dihydroxy compound.

7. The laminated structure of claim 1 wherein the saponified olefin/vinyl acetate copolymer has an olefin content of 15 to 60 mole % and a degree of saponification of at least 50%.

8. The laminated structure of claim 1 wherein the layer (A) has a thickness of 0.01 to 5 mm, the layer (B) has a thickness of 0.005 to 1 mm, and the layer (C) has a thickness of 0.005 to 1 mm.

9. A laminated structure comprising, laminated in the order stated,
   (A') a layer of a polyester,
   (B') a layer of a modified ethylene/alpha-olefin random copolymer, the modified copolymer containing about 0.01 to 10% by weight, based on the trunk ethylene/alpha-olefin random copolymer, of an unsaturated carboxylic acid or its derivative grafted thereto, and having an ethylene content of 75 to 95 mole %, a melt flow rate of 0.1 to 50 g/10 min., a density of 0.850 to 0.905 g/cm$^3$ and a crystallinity of less than 10%, and
   (C') a layer of a saponified olefin/vinyl acetate copolymer or a polyamide resin layer.

10. The laminated structure of claim 9 wherein the amount of the unsaturated carboxylic acid or its derivative grafted is 0.1 to 5% by weight.

11. The laminated structure of claim 9 wherein the modified ethylene/alpha-olefin random copolymer has an ethylene content of 77 to 93 mole %.

12. The laminated structure of claim 9 wherein the modified ethylene/alpha-olefin random copolymer has a melt flow rate of 0.2 to 20 g/10 min.

13. The laminated structure of claim 9 wherein the modified ethylene/alpha-olefin random copolymer has a density of 0.860 to 0.900 g/cm$^3$.

14. The laminated structure of claim 9 wherein the polyester has units derived from an aromatic dicarboxylic acid and an aliphatic alcohol.

15. The laminated structure of claim 9 wherein the saponified olefin/vinyl acetate copolymer has an olefin content of 15 to 60 mole % and a degree of saponification of at least 50%.

16. The laminated structure of claim 9 wherein the layer (A') has a thickness of 0.02 to 5 mm, the layer (B') has a thickness of 0.01 to 1 mm, and the layer (C') has a thickness of 0.01 to 1 mm.

17. The laminated structure of claim 9 wherein (C') comprises the layer of saponified olefin/vinyl acetate copolymer.

18. The laminated structure of claim 9 wherein (C') comprises the polyamide resin layer.

19. The laminated structure of claim 9 wherein the α-olefin of the modified ethylene/α-olefin random copolymer has from 3 to 20 carbon atoms.

20. The laminated structure of claim 9 wherein the α-olefin of the modified ethylene/α-olefin random copolymer is at least one of propylene, 1-butene, 1-hexene, 4-methyl-1-butene, 1-octene, 1-decene, 1-tetradecene, or 1-octadecene.

21. The laminated structure of claim 20 wherein the trunkethylene/α-olefin random copolymer is an ethylene/propylene or ethylene/1-butene random copolymer.

22. The laminated structure of claim 1 wherein the α-olefin of the modified ethylene/α-olefin random copolymer has from 3 to 20 carbon atoms.

23. The laminated structure of claim 1 wherein the α-olefin of the modified ethylene/α-olefin random copolymer is at least one of propylene, 1-butene, 1-hexene, 4-methyl-1-butene, 1-octene, 1-decene, 1-tetradecene, or 1-octadesene.

24. The laminated structure of claim 23 wherein the trunkethylene/α-olefin random copolymer is an ethylene/propylene or ethylene/1-butene random copolymer.

* * * * *

UNITED STATES PATENT AND TRADEMARK OFFICE
CERTIFICATE OF CORRECTION

PATENT NO. : 4,900,612
DATED : February 13, 1990
INVENTOR(S) : KOICHIRO SATO ET AL.

It is certified that error appears in the above-identified patent and that said Letters Patent is hereby corrected as shown below:

On the cover page, the Appl. No. should read --000,898--.

Claim 21, line 2 of the claim, "trunkethylene" should read --trunk ethylene--.

Claim 23, line 5 of the claim, "1-octadesene" should read --1-octadecene--.

Claim 24, line 2 of the claim, "trunkethylene" should read --trunk ethylene--.

Signed and Sealed this

Twenty-third Day of April, 1991

Attest:

HARRY F. MANBECK, JR.

*Attesting Officer*    Commissioner of Patents and Trademarks